Nov. 5, 1929.                S. I. FEKETE                1,734,249
                         BRAKE LEVER EXTENSION
                       Filed April 9, 1927          2 Sheets-Sheet 1
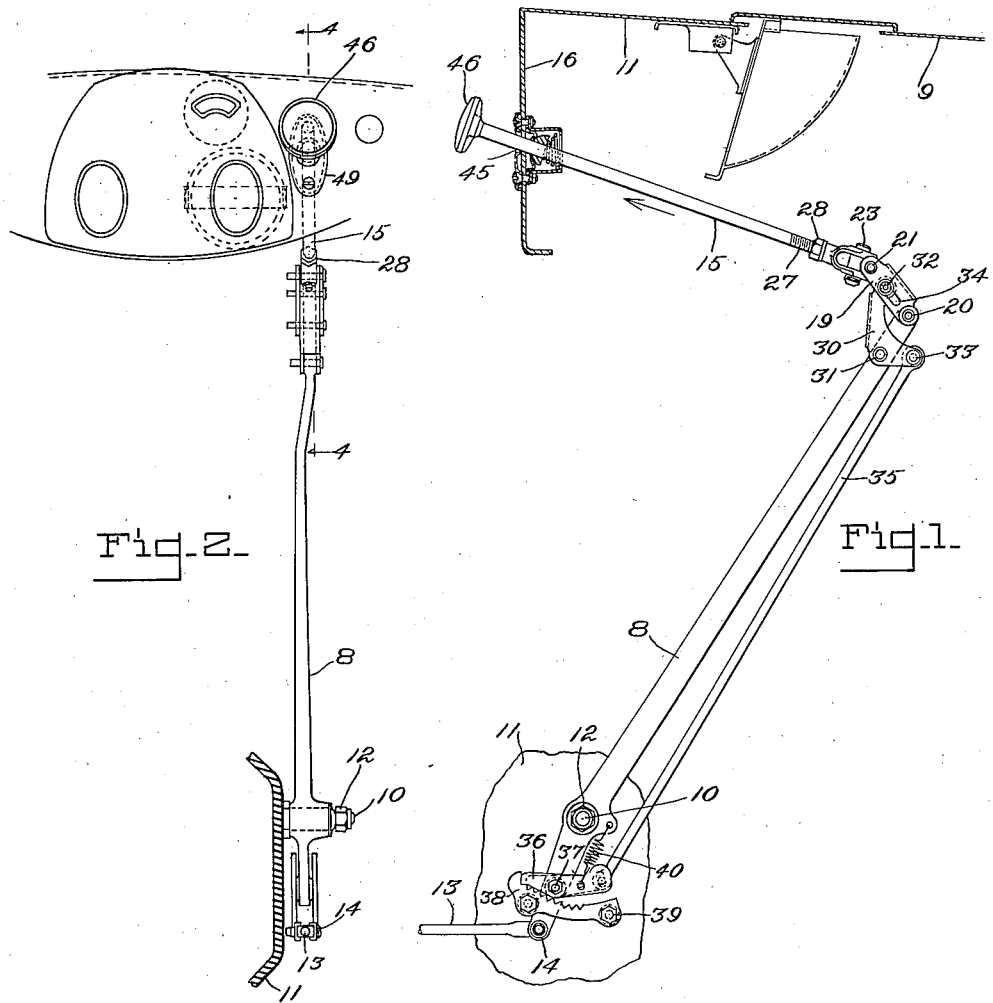
INVENTOR=
Stephen I. Fekete.
By Macleod, Calver, Copeland & Dike.
ATTORNEYS=

Nov. 5, 1929. S. I. FEKETE 1,734,249
BRAKE LEVER EXTENSION
Filed April 9, 1927 2 Sheets-Sheet 2
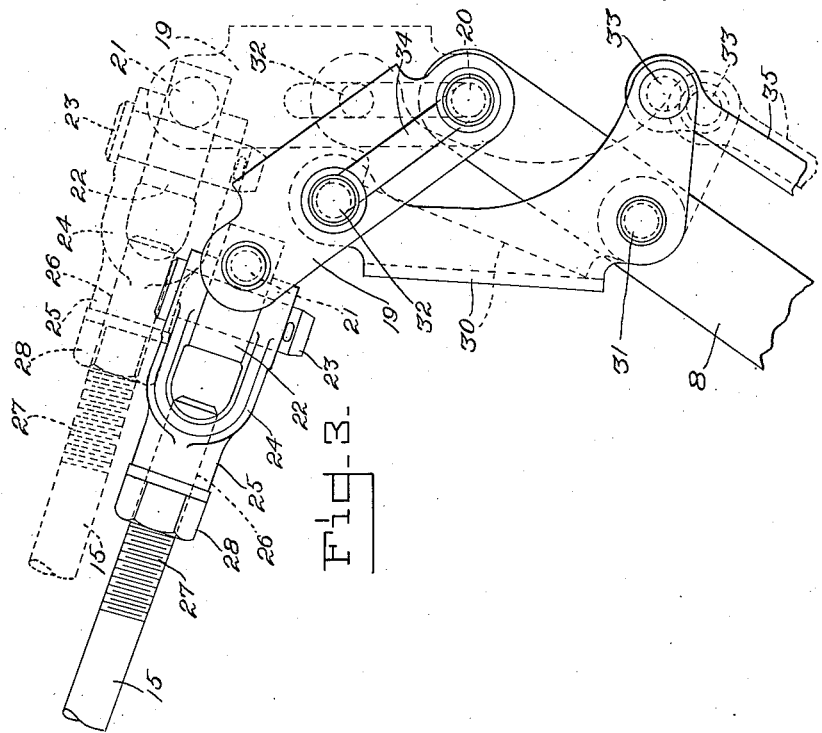

Patented Nov. 5, 1929

1,734,249

UNITED STATES PATENT OFFICE

STEPHEN I. FEKETE, OF DETROIT, MICHIGAN, ASSIGNOR TO HUDSON MOTOR CAR COMPANY, OF DETROIT, MICHIGAN, A CORPORATION OF MICHIGAN

BRAKE-LEVER EXTENSION

Application filed April 9, 1927. Serial No. 182,460.

This invention relates to brake operating mechanism for a vehicle, such as an automobile, and more particularly to the provision of means for operating the brake mechanism from an easily accessible point within the vehicle.

In certain types of automobiles it is desirable to arrange the mechanism within the vehicle for operating the same so as to provide ample unobstructed space for its occupants. With this in view it has been common heretofore to position the operating lever for the emergency brake so that it extended upwardly and forwardly under the cowl a considerable distance. This is very desirable but, heretofore, has rendered the emergency brake inaccessible and inconvenient to operate. Most drivers of an automobile seldom use the emergency or hand brake except to park the car, or in case of a sudden emergency where it is desired to obtain maximum braking power to stop the vehicle as soon as possible. The operator of the vehicle often fails to locate and operate the hand brake as quickly as is desired when emergencies arise It is an object of the present invention to provide an extension, preferably in the form of a rod extending from an easily accessible point, such as the instrument board, and connected by a lever, such as a bell crank, with the operating lever of the brake mechanism so that the latter may be actuated readily, and preferably by a push or pull upon the rod whereby the locking dog is disengaged.

The invention will be more clearly understood from the following description in conjunction with the accompanying drawings; in which Fig. 1 is an elevational view of a brake operating mechanism embodying the invention.

Fig. 2 is an elevational view of the same viewed from the instrument board.

Fig. 3 is a detail elevational view of the mechanism connecting the extension rod with the lever for operating the brake mechanism; and Fig. 4 is a detail sectional elevational view taken upon the line 4—4 of Fig. 2.

One form of brake operating mechanism embodying the invention is shown in the drawings comprising a brake operating lever 8 extending upwardly and forwardly a substantial distance beneath the cowl 9 of a vehicle, said lever being pivotally mounted to swing upon a stud 10 extending from a portion of the chassis, such as a housing 11 for the clutch, the lever 8 being held upon the stud by a lock nut 12. One arm of the lever 8 extends downwardly from its pivotal mounting and is pivotally connected with a rod 13 extending to the brake mechanism by a pin 14. The other arm of the lever 8 extends upwardly and forwardly a substantial distance and is operatively connected to a rod 15 extending from an easily accessible point, such as the instrument board 16 of the vehicle, by a mechanism enabling operation of the brake lever 8 by merely pushing or pulling upon the rod 15. The mechanism specifically illustrated for this purpose comprises a link 19 pivoted at one end upon a pin 20 at the end of the lever 8 and pivotally connected at its other end to a pin 21 carried by a collar 22 held by a bolt 23 within the arms of a yoke 24 at one end of a link 25. The other end of the link 25 is provided with a threaded hole 26 for receiving the threaded portion 27 of the rod 15 and is locked in position by a lock nut 28. A bell crank 30 is pivotally mounted upon the lever 8 and the link 19 so as to permit movement of one of said pivotal mountings relative to the rod 15. For this purpose, as illustrated, a pin 32 on the crank 30 is mounted in a slot 34 in the link 19, the crank 30 being fulcrumed upon a pin 31 on the lever 8. The other end of the bell crank 30 is pivotally connected to a pin 33 upon one end of a rod 35 connected with a dog 36 pivotally mounted upon the lever 8 by a pin 37 so as to operatively engage the teeth of a rack 38 rigidly secured to the chassis of the vehicle by bolts 39. The dog 36 is normally held in engagement with the teeth of the rack 38 by a spring 40 extending between the dog and the lever 8.

The rod 15 passes through an opening 45 in the instrument board 16 (Figs. 1 and 4) and has secured to the end thereof a suitable handle, such as a knob 46 having a threaded hole 47 engaging a threaded portion 48 of the rod 15. A trim panel 46 surrounds the opening 45 on the visible side of the instrument board 16 and is secured thereto by bolts 50. A plate 51 is held on the opposite or dash side of the instrument board 16 by the bolts 50 and is provided with an opening 52 for the rod 15. Surrounding the opening 52 the plate 51 is formed with a concave, substantially spherical bearing surface or socket engaged by a complementary surface formed on a collar or ball member 53 slidably mounted on the rod 15, and serving to support and guide the latter in the instrument board. The collar 53 is resiliently held against the bearing surface of the plate 51 in any suitable manner, as by a spiral spring 55 interposed between the collar 53 and a box-like supporting frame 56 held against the plate 51 by nuts 57 on bolts 50. The frame 56 is provided with an opening 58 for the passage of the rod 15.

In order to apply the emergency brakes to stop the vehicle it is only necessary that the operator grasp the knob 46 so as to pull the rod 15 towards him, or in the direction of the arrow in Fig. 1, which operates the lever 8 to move the rod 13 and thus apply the brakes. When it is desired to release the brakes, the rod 15 is pushed or moved in the opposite direction, whereupon the bell crank 30 is first moved to actuate the rod 35 and disengage the dog 36 from the teeth of the rack 38 thus permitting the lever 8 to swing in the general direction of movement of the rod 15. During the movement of the rod 15 in either direction its position laterally is changed. Binding in the opening 45 due to this lateral displacement of the rod 15 is prevented by supporting the rod in the adjustable bearing 53 which is constructed and arranged to change its position upon the plate 51 in response to lateral displacement of the rod 15.

What I claim is:

1. In a brake operating mechanism for a vehicle, the combination with an operating lever and a dog for locking the same, of an extension for said lever comprising a rod, a link pivotally connected at its ends to the ends of said lever and said rod, and a bell crank pivotally mounted upon said lever and operatively connected at one end with the locking dog and at its other end with said link.

2. In a brake operating mechanism for a vehicle, the combination with an operating lever and a dog for locking the same, of an extension for said lever comprising a rod, a link pivotally connected at its ends to the ends of said lever and rod, a bell crank pivotally mounted upon said lever and said link and operatively connected at one end with the locking dog, and means permitting movement of one of said pivotal mountings of the bell crank relative to said rod.

3. In a brake operating mechanism for a vehicle, the combination with an operating lever and a dog for locking the same, of an extension for said lever comprising a rod operable through an opening in the instrument board of the vehicle, means connecting said rod and lever for unlocking said dog upon movement of the rod, and a ball member adjustable in said opening for supporting said rod.

4. In a brake operating mechanism for a vehicle, the combination with an operating lever and a dog for locking the same, of an extension for said lever comprising a rod operable through an opening in the instrument board of the vehicle, means connecting said rod and lever for unlocking said dog upon movement of the rod, and means for slidably supporting said rod in said opening including a substantially spherical ball member engaging said opening and having an opening for said rod, and resilient means for seating said ball member in said opening.

5. In a brake operating mechanism for a vehicle, the combination with an operating lever and a dog for locking the same, of an extension for said lever comprising a rod operable through an opening in the instrument board of the vehicle, a bell crank mounted upon said lever and pivotally connected at one end to the rod, said bell crank being operatively connected at its other end with the locking dog, and a ball member adjustable in said opening for supporting said rod.

In testimony whereof I affix my signature.

STEPHEN I. FEKETE.